C. P. VAUCLAIN & J. M. BURNS.
PROCESS OF HEADING STAY BOLTS.
APPLICATION FILED APR. 12, 1913.

1,119,735.

Patented Dec. 1, 1914.

Witnesses—

Inventors.
Charles P. Vauclain.
John M. Burns.
by their Attorneys
Howson & Howson

UNITED STATES PATENT OFFICE.

CHARLES P. VAUCLAIN, OF ROSEMONT, AND JOHN M. BURNS, OF PHILADELPHIA, PENNSYLVANIA, ASSIGNORS TO THE BALDWIN LOCOMOTIVE WORKS, OF PHILADELPHIA, PENNSYLVANIA, A CORPORATION OF PENNSYLVANIA.

PROCESS OF HEADING STAY-BOLTS.

1,119,735. Specification of Letters Patent. Patented Dec. 1, 1914.

Application filed April 12, 1913. Serial No. 760,666.

*To all whom it may concern:*

Be it known that we, CHARLES P. VAUCLAIN and JOHN M. BURNS, citizens of the United States, residing in Rosemont, county of Montgomery, State of Pennsylvania, and Philadelphia, county of Philadelphia, State of Pennsylvania, respectively, have invented certain Improvements in the Process of Heading Stay-Bolts, of which the following is a specification.

Our invention relates to certain improvements in the process of forming heads on stay bolts after said bolts have been screwed into the plate of a boiler so as to make the joint between the stay bolt and the boiler fluid tight.

Stay bolts are used to stay two adjoining sheets of a boiler so as to prevent warping of one sheet with respect to the other and to materially strengthen the boiler. Usually, it has been the custom to use a stay bolt of such a length that the ends of the stay bolt will project beyond the surfaces of the boiler and reducing these projecting portions by hammering to form the heads. This practice causes the projecting portions of the bolt to split and great care must be exercised in forming the head so that the bolt will have a neat appearance. In many instances, after the head has been formed, the joint must be calked in order to make it steam and water tight. Stay bolts having a central tell tale hole have to be finished with care as the tendency is to close this hole in forming the head and the head must be drilled or reamed after the rivet has been completed, which takes time and makes the operation an expensive one.

By our improved process, we are enabled to properly head stay bolts without cracking the head and also without filling the tell tale hole.

Figure 1:
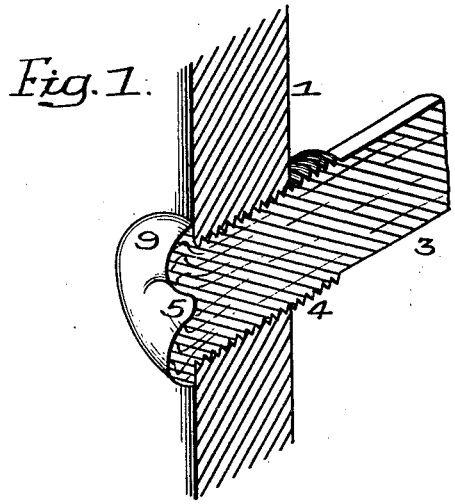
Figure 2:
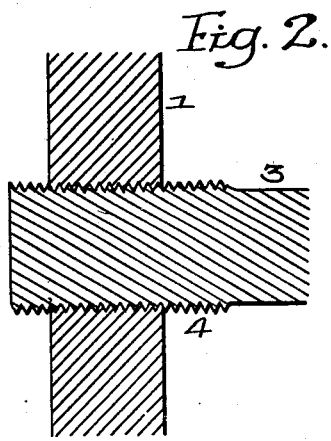

In the accompanying drawings: Figure 1 is a sectional perspective view of a stay bolt headed in accordance with our invention; Figs. 2 to 5, inclusive, are sectional views illustrating different steps in the process, and Fig. 6 is a sectional view showing the complete stay bolt with the tell tale opening at one end.

Referring to the drawings, 1 and 2 are the two plates of the boiler spaced apart.

3 is the stay bolt connecting the plates. In the present instance, the stay bolt has a threaded section 4 at each end and at one end is a head by which the bolt is turned when it is screwed into position. After the stay bolt is located, this head is removed, leaving a portion of the stay bolt projecting at each end beyond the plates of the boiler so as to provide sufficient metal for the heads 9.

Figure 3:
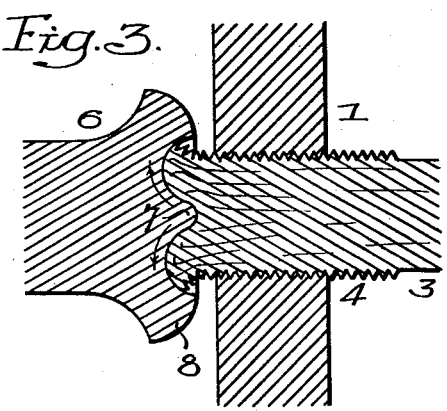
Figure 4:
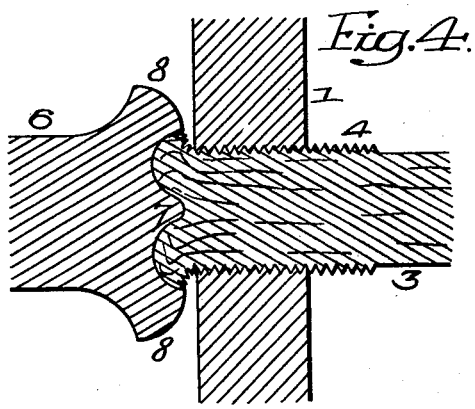

The first step in our improved process is to indent the center of the stay bolt, as at 5, Fig. 3, causing the metal to flow in the direction of the arrow, Fig. 3. The indentation, however, does not extend beyond the line of the plate. We accomplish this, in the present instance, by a tool 6 having a central projection 7 with a round end. This tool also has an annular flange 8 and the recess between the flange and the central rounded projection is curved, as shown. As the pressure of the tool is increased the metal of the projecting portion of the stay bolt is gradually turned over, as illustrated in Fig. 4, forming the enlargement from which the head 9 is finally made, as in Fig. 5, which illustrates the tool pressed against the plate of the boiler and the head confined within the annular recess. This gradual spreading of the end of the stay bolt, while the periphery is confined by the curved portion of the tool, prevents the edges of the stay bolt from splitting and making a defective head.

Figure 5:
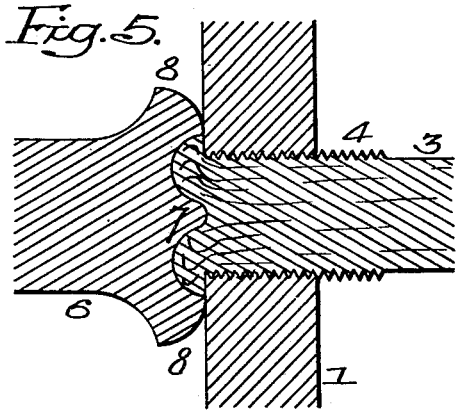
Figure 6:
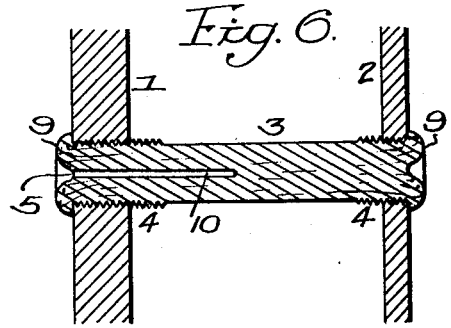

The head, when completed, as in Figs. 1 and 5, fits tightly against the plate of the boiler and is perfectly formed. The displacement of the center of the stay bolt does not extend beyond the outer face of the plate and, consequently, does not expand the metal of the stay bolt within the screw threaded opening, as we do not desire to enlarge the stay bolt within the opening, but to form a head on that portion of the stay bolt beyond the plate.

When a stay bolt of the type having a tell tale opening 10 is used, as in Fig. 6, the process of heading does not close this opening, but by forcing the metal from the center outward keeps the center open at all times, making it unnecessary to re-drill or to ream the stay bolt after the head is finished.

We claim:

The process herein described of heading stay bolts, said process consisting in first screwing said stay bolt into the plate to which it is to be secured so that its end projects beyond the plate, then indenting the center of the bolt and simultaneously forcing the projecting metal of the stay bolt outward from the central depression without materially displacing the metal within the opening of the plate and while the periphery of the bolt is confined, thus making a steam-tight joint between the bolt and the outer edge of the plate, then, as the displacement of the metal is continued, turning it down onto the outer surface of the plate so as to make a completed circular head having a central depression and making a steam-tight joint between the outer end of the bolt and the outer portion of the plate.

In testimony whereof, we have signed our names to this specification, in the presence of two subscribing witnesses.

CHARLES P. VAUCLAIN.
JOHN M. BURNS.

Witnesses:
J. H. KERST,
M. B. GREENACRE.